(12) United States Patent
Schuster et al.

(10) Patent No.: US 6,741,919 B1
(45) Date of Patent: May 25, 2004

(54) METHODS AND APPARATUS FOR DETECTING IMPENDING SENSOR FAILURE

(75) Inventors: Richard Francis Schuster, Loveland, OH (US); Malcolm John Ashby, Hamilton, OH (US); Matthew William Wiseman, Farifield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/375,649

(22) Filed: Feb. 26, 2003

(51) Int. Cl.$^7$ .................................................. G06F 7/00
(52) U.S. Cl. ........................................................ 701/34
(58) Field of Search ............................. 701/29, 30, 34, 701/99, 107

(56) References Cited

U.S. PATENT DOCUMENTS

| | | |
|---|---|---|
| 6,314,350 B1 | 11/2001 | Butz et al. |
| 6,326,758 B1 | 12/2001 | Discenzo |
| 6,439,202 B1 | 8/2002 | Carroll, III et al. |
| 6,456,928 B1 | 9/2002 | Johnson |
| 6,481,210 B1 | 11/2002 | Chapman |

*Primary Examiner*—Y. Beaulieu
(74) *Attorney, Agent, or Firm*—Willam Scott Andes; Armstrong Teasdale LLP; Robert B. Reeser, III

(57) ABSTRACT

A method and apparatus for detecting an impending failure of a process sensor is provided. The method includes determining a sensor output noise component, and comparing the output noise component to a historical sensor output noise signature based on at least one of the range of span of the sensor and the process operating conditions. The apparatus includes a computing device including a processor and a memory communicatively coupled to the processor wherein the processor is programmed to execute a software product code segment that includes a comparator, a data historian, an isolator module, and a limit module. The computing device is configured to detect impending failure of a sensor using an output signal noise component of the sensor and wherein the sensor senses a parameter of a process associated with the computing device.

20 Claims, 4 Drawing Sheets

METHODS AND APPARATUS FOR DETECTING IMPENDING SENSOR FAILURE

BACKGROUND OF THE INVENTION

This invention relates generally to gas turbine engines, and more specifically to a method and apparatus for detecting impending sensor failure.

At least some known gas turbine engines include a compressor, a combustor, and at least one turbine. The compressor compresses air which is then channeled to the combustor. The compressed air is mixed with fuel and ignited within the combustor to generate combustion gases which are channeled to the turbine. The turbine extracts energy from the combustion gases to power the compressor, as well as to produce useful work to propel an aircraft in flight or to power a load, such as an electrical generator.

At least some known engines also include a plurality of sensors for monitoring operating conditions related to the engine. For example, the engine may include sensors that monitor temperature, pressure, speed, flow, displacement, and strain. During operation, the sensors may be exposed to adverse environmental and operating conditions, such as temperature extremes, vibration, and combustion gases. Over time, continued exposure to such conditions may cause a premature failure of some of the sensors, which may adversely impact the operation of the engine and airframe. To facilitate reducing the failure rate of engine sensors, at least some known gas turbine engines include redundant sensors in critical applications, and/or monitoring system which monitor the sensor output signals. More specifically, at least some known gas turbine engines operate with sensors that are replaced after failure or based on predetermined sensor values, or include sensors that are replaced on a regular schedule regardless of the operating capability of the installed sensor. However, such methods may not provide desired results, and waiting for a sensor to fail to replace it, or replacing an operating sensor based on a time or operating hours schedule may be costly and time-consuming.

BRIEF DESCRIPTION OF THE INVENTION

In one aspect, a method for detecting an impending failure of a process sensor is provided. The method includes determining a sensor output noise component, and comparing the output noise component to a historical sensor output noise signature based on at least one of the range of span of the sensor and the process operating conditions.

In another aspect, a method for detecting an impending failure of a gas turbine engine sensor is provided. The method includes sampling the sensor output for a predetermined time period to obtain a representative sample of the output signal, determining a current sensor output signal, determining a range of span of the sensor, determining a sensor output noise component, and comparing the output noise component to a historical sensor output noise signature based on at least one of the range of span of the sensor and the engine operating conditions.

In yet another aspect, an apparatus for a gas turbine engine that includes a computing device is provided. The computing device includes a processor, and a memory communicatively coupled to said processor wherein the processor is programmed to execute a software product code segment that includes a comparator, a data historian, an isolator module, and a limit module and wherein the computing device is programmed to detect impending failure of a sensor using an output signal noise component of the sensor and wherein the sensor senses a parameter of a process associated with the computing device.

DETAILED DESCRIPTION OF THE INVENTION

As used herein, the term "sensor noise" is defined as excursions of a sensed value from an expected value, wherein such excursions are not caused due to normal signal processing variations or engine operating transients, but may in fact be due to such factors, including but not limited to degraded sensor materials, faulty electrical connections, and/or dirty pneumatic or sensing lines. As defined herein, sensors may include any component configured to transmit a signal that is proportional to a monitored parameter to a control and/or display component. Furthermore, although the invention is described herein in association with a gas turbine engine, it should be understood that the present invention is applicable to other engine sensors and sensors in any application. Accordingly, practice of the present invention is not limited to engine sensors for gas turbine engines. In addition, although the invention is described herein in association with electrical and electronic sensors, it should be understood that the present invention may be applicable to pneumatic, hydraulic, and any sensor. Accordingly, practice of the present invention is not limited to electronic or electrical sensors.

Figure 1:
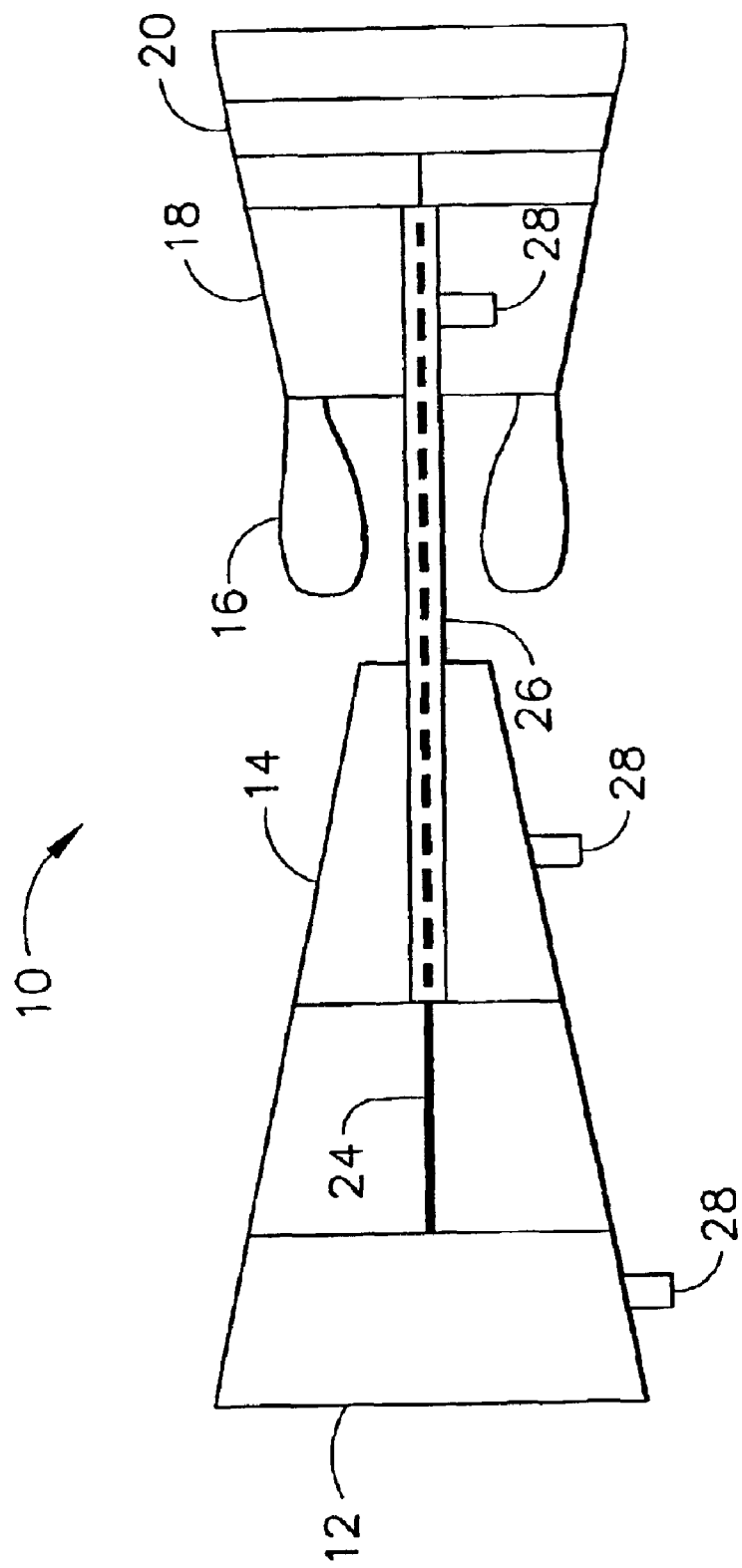
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18, and a low pressure turbine 20. Compressor 12 and turbine 20 are coupled by a first rotor shaft 24, and compressor 14 and turbine 18 are coupled by a second rotor shaft 26. Engine 10 includes a plurality of sensors 28 for monitoring parameters within engine 10. More specifically, for example, sensors 28 may be included in engine 10 that monitor a gas temperature, a gas pressure, an engine rotating speeds a fuel flow, and a stator vane position. Examples of sensor types are given by way of example only and are not limiting as to the type of sensor that may be used in gas turbine engine 10. In one embodiment, engine 10 is a GE90 engine available from General Electric Aircraft Engines, Cincinnati, Ohio.

In operation, air flows through low pressure compressor 12 and compressed air is supplied from low pressure compressor 12 to high pressure compressor 14. Compressed air is then delivered to combustor 16 and airflow from combustor 16 drives turbines 18 and 20. Sensors 28 develop signals representative of a monitored parameter and such signals are transmitted to an electronic control (not shown).

Figure 2:
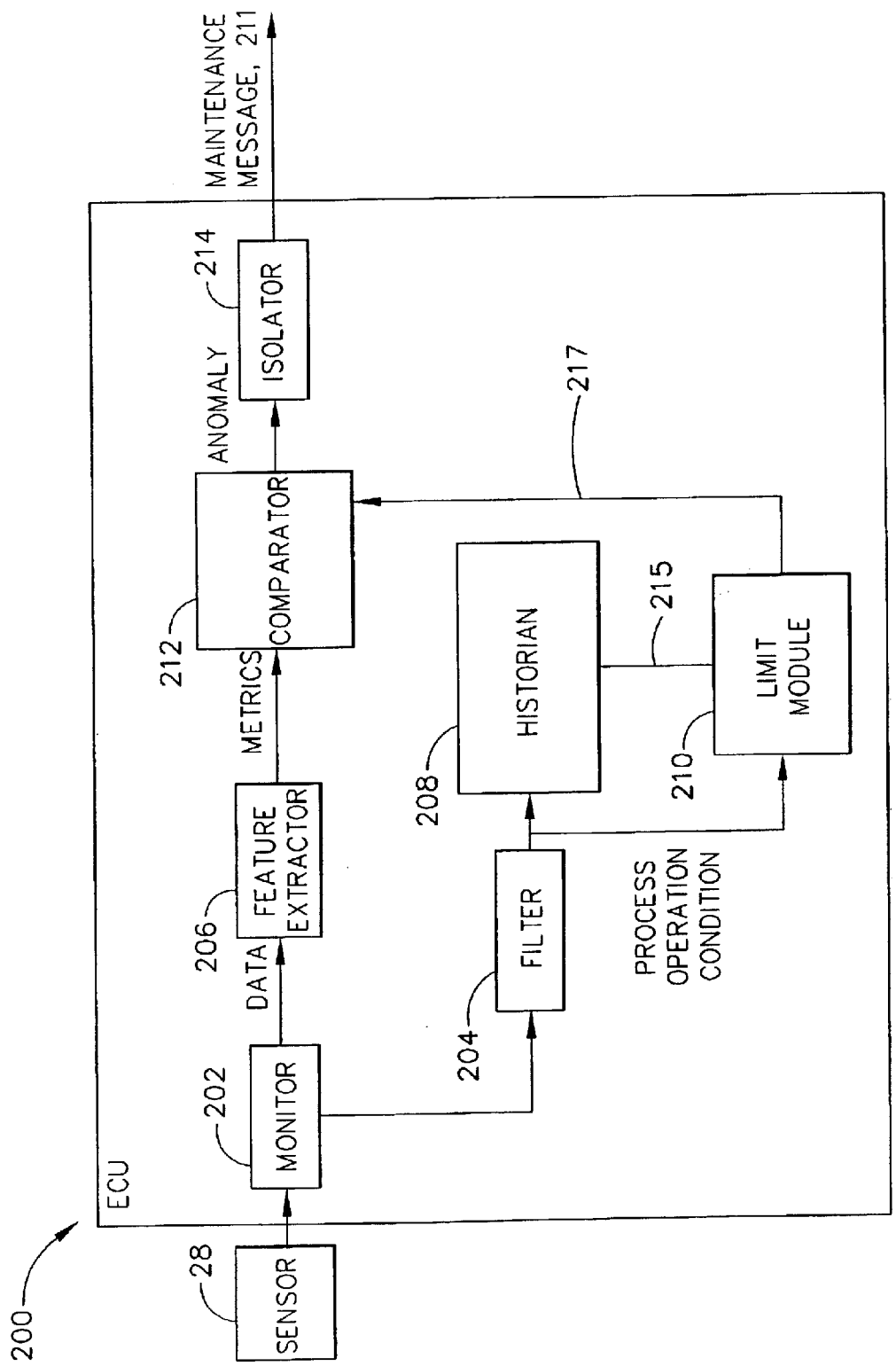
FIG. 2 is block diagram of an exemplary engine control unit (ECU) that may be used with the engine shown in FIG. 1.

FIG. 2 is a data flow diagram of an exemplary engine control unit (ECU) 200 that may be used with engine 10 shown in FIG. 1. ECU 200 may be any suitable computing device or logic device, including, but not limited to, general purpose computers and/or dedicated single purpose computing devices, which may include single board, microprocessor based devices. ECU 200 includes monitoring logic 202 and a filter 204. In one embodiment, monitoring logic 202 and filter 204 are embodied in software stored in a non-volatile memory of ECU 200. ECU 200 is communicatively coupled to at least one sensor 28 and may be mounted remotely from engine 10 wherein each sensor 28 is coupled communicatively to ECU 200. Monitoring logic 202 receives input signals from at least one sensor 28 mounted on, or proximate to engine 10 that are representative of various engine operating parameters. Monitoring logic 202 also receives input signals from sensors 28 mounted on an airframe, such as but not limited to, engine power demand, and transmits at least a portion of each signal to filter 204. Monitoring logic 202 collects sensor data and formats sensor data in a form that can be used by filter 204 and a feature extractor 206 based on internal algorithms and an output from sensor 28. Filter 204 provides process operating conditions to a data historian 208 and a limit module 210 using collected sensor data from monitoring logic 202.

Sensor failures in which the sensor output goes either high or low offscale are termed offscale failures and are relatively easy to detect. Onscale failures are those sensor failures wherein an output of the sensor remains within a normal range, but the sensor measurement is inaccurate. Onscale failures tend not to be associated with the transmitter itself but rather with the remainder of the measurement system. Some known sensors experience a failure mode such as a "soft failure", which is a sensor failure during particular modes of operation that reverts to correct operation when the operational stresses are reduced to a less stressful level. Onscale and soft failures may exhibit characteristic noise signatures on the sensor output signal that may be detected prior to a sensor offscale failure. ECU 200 is programmed to analyze sensor output signals provided by sensor 28, determine a noise component of the signal, trend the noise component historically, and store acceptable deviation ranges for the noise components. Determined data may be output through data communication line or channel 211.

Feature extractor 206 assesses an output of monitoring logic 202 and determines metrics relative to the noise content of the data. Feature extractor 206 also develops a statistical analysis of the predicted and observed sensor output and noise signature.

ECU 200 includes a comparator 212, data historian 208, and an isolator module 214. A result of historian 208 is coupled to limit module 210 through a data communication line or channel 215. Limit module 210 is communicatively coupled to comparator 212 through data line or channel 217. The result of historian 208 may be used to update limits provided by limit module 210 to comparator 212.

Data historian 208 may store noise component signatures and signature trend data for sensor 28 output over time, where the sample interval may vary and be appropriate for the time constant or period for each sensor being monitored. In one embodiment, historical noise signature data may be stored in a circular file, for a fixed period of time, before being overwritten with new data. Historical data may also be filtered prior to being stored and may also be compressed.

Historian 208 includes an extrapolation function, which projects current signatures and historical data into the future. Using an appropriate limit from limit module 210, and the projection provided to comparator 212 by the extrapolation function of historian 208, comparator 212 determines whether any of the projected noise signatures will be outside of the acceptable limits in the future. If the projected data falls outside of the acceptable limits, comparator 212 can output an alarm signal and/or maintenance message through output line 211.

The projection made by historian 208 includes a sophisticated signal extrapolation method based on the current operating range of sensor 28, operational ranges of other related sensors, and engine operating conditions. Limit module 210 provides acceptable limits for noise metrics to comparator 212, based upon process operating conditions provided from filter 204. These limits may be updated over time based on historical trends available from historian 208.

Comparator 212 assesses actual noise metrics provided from feature extractor 206 against the noise metric limits provided from limit module 210. Comparator 212 outputs alerts of impending failures for the sensors for which there were exceedances.

Based on alerts generated by comparator 212, isolator 214 identifies a specific fault type that could account for the exceedance. In one embodiment, this function is performed by a neural network.

A neural network is a system of programs and data structures that that facilitates performing tasks such as pattern recognition, data mining, classification, and process modeling. In the exemplary embodiment, neural network (isolator) 214 is implemented in software rather than by a plurality of paralleled processors. Neural network (isolator) 214 maybe used to isolate the fault to a specific type.

Figure 3:
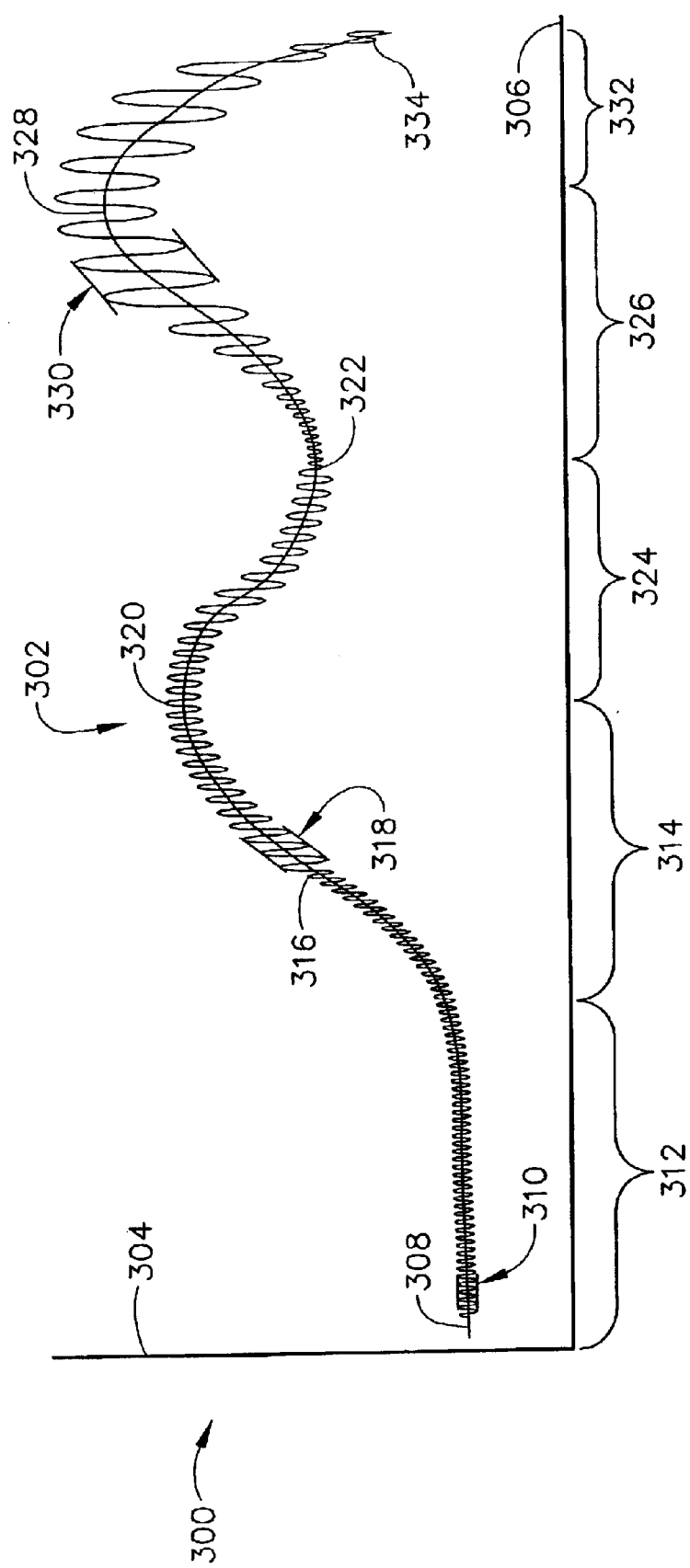
FIG. 3 is a graph of an exemplary sensor output signal that may be monitored by the ECU shown in FIG. 2.

FIG. 3 is a graph 300 of an exemplary sensor output signal 302 that may be monitored by ECU 200 shown in FIG. 2. Graph 300 includes a y-axis 304 that may represent a magnitude of a monitored parameter received by monitoring logic 202. An x-axis 306 may represent an independent time parameter over which signal 302 may be monitored. Signal 302 includes a signal portion 308 that is proportional to the process parameter monitored by sensor 28 including offset errors, drift errors, linearity errors, and hysteresis errors. Signal 302 also includes a noise portion 310 that modulates signal portion 308 due to for example, electromagnetic interference (EMI) pickup, sensor electronics soft failure, sensor element degradation, and/or a faulty or intermittent coupling of sensor 28 to the monitored parameter. For example, a loose connection on a temperature sensor may allow a local difference between the monitored temperature, and the temperature at the sensing element. Such a loose connection may cause an intermittent deviation between the temperature at the sensing element, and the monitored temperature due to a vibration of the sensor or a temperature expansion of the sensor or process components.

X-axis 306 includes a first period 312 wherein signal is 302 is represented as a relatively constant signal output from sensor 28. Signal 302 includes a constant magnitude signal portion 308, and a noise portion 310, which varies at a characteristic rate. The characteristic rate that noise portion 308 varies represents a unique signature for a particular sensor in a particular location. A second period 314 of x-axis 306 represents an increasing magnitude of the monitored parameter being monitored by sensor 28. In the exemplary embodiment, noise portion 310 is indicated to increase in amplitude at a point 316 to an amplitude 318. In an alternative embodiment, noise portion 310 may also increase in rate and/or frequency. The change in amplitude of noise portion 310 at point 310 may be due to sensor operation in an operational range of span of sensor 28 where a defect in sensor 28 is manifest. As signal 302 increases in magnitude from point 316 to a local maximum 320, the amplitude of noise portion 310 is illustrated as remaining substantially constant at amplitude 318. At local maximum 320, the exemplary magnitude of signal 302 is illustrated as decreasing to a local minimum 322 during a third period 324 of x-axis 306. In the exemplary embodiment, the magnitude of signal 302 at local minimum 322 is illustrated as being greater than the magnitude of signal 302 at point 316. During a fourth period 326 of x-axis 306, signal 302 is increasing to a local maximum 328. During period 326, noise portion 310 is illustrated as increasing in amplitude at a constant rate to amplitude 330. Thereafter, during a fifth period 332 of x-axis 306 the magnitude of signal 302 decreases to a point 334 wherein signal 302 resumes a magnitude substantially equal to the magnitude of signal 302 during period 312. During period 332, noise portion 310 decreases at a constant rate to an amplitude substantially equal to the magnitude of noise portion during period 312.

Graph 300 illustrates an exemplary response of sensor 28 to a varying process parameter. The changes in amplitude of noise portion 310 are illustrative of possible responses to varying ranges and conditions of operation of sensor 28.

Figure 4:
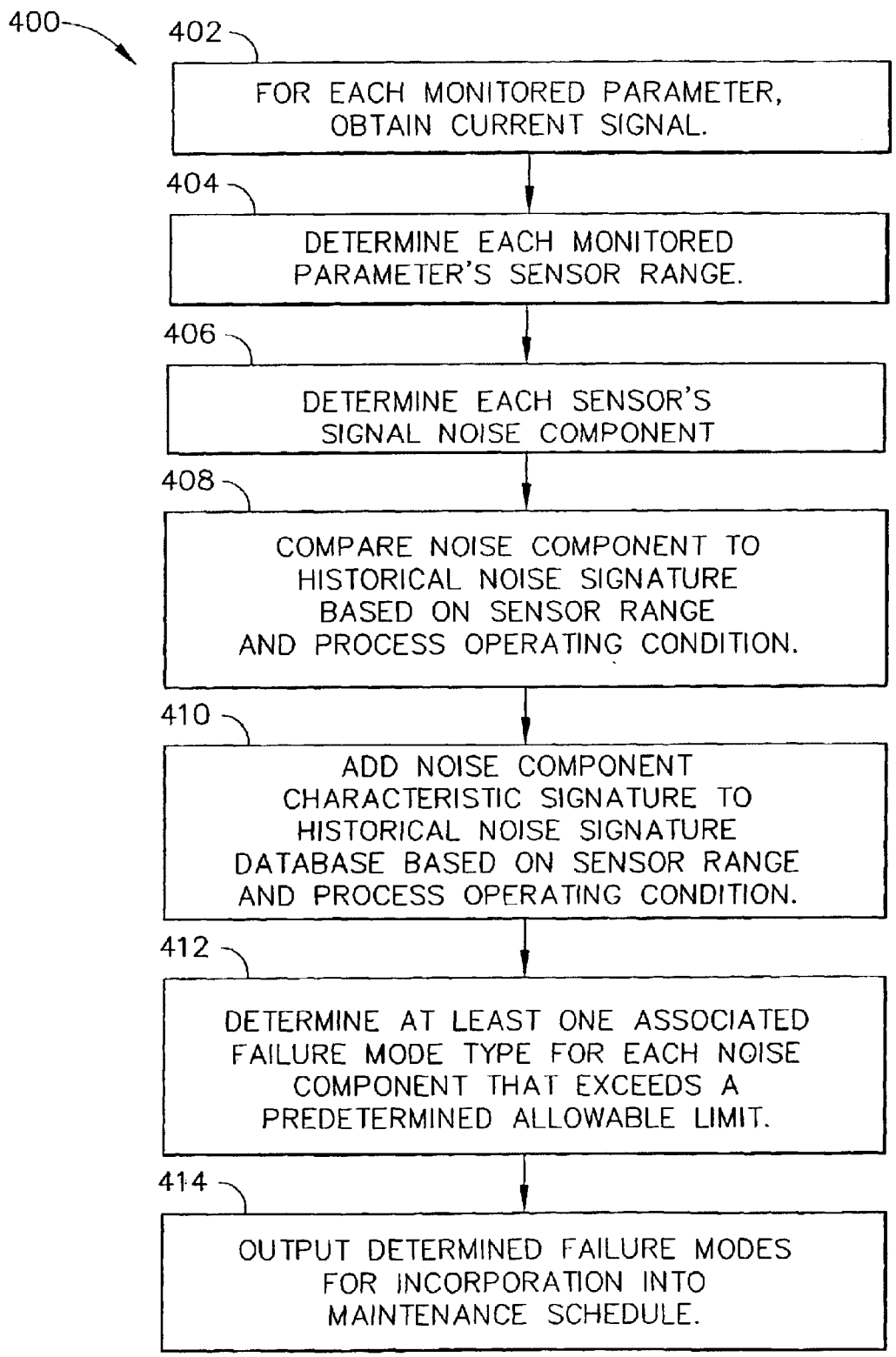
FIG. 4 is a flow chart of an exemplary process 400 for detecting impending sensor failure.

FIG. 4 is a flow chart of an exemplary process 400 for detecting impending sensor failure by tracking sensor output signal noise which may be incorporated in a computer program executing within ECU 200 or other computer. The computer program may be any suitable compiled or interpreted program that includes but, is not limited to, languages such as Basic, Java, C, C++, or ladder logic. In step 402, each monitored parameter signal may be updated to obtain 402 a current signal value. A current signal value is sampled from each sensor 28 for a predetermined duration, which is long enough to characterize the noise component of the signal. The monitored signals may be updated by directly reading analog or discrete sensors. Discrete or binary sensors may be characterized for noise and/or signal bounce such as may occur when switch contacts close momentarily due to vibration and/or impulse.

The signal range of span is determined 404 to facilitate characterizing the sensor signal noise component. Sensor 28 may exhibit a different noise signature when operating in different ranges of its output span. For example, a larger amplitude noise component at higher ranges of sensor span than at lower ranges of span may be indicative of a sensor element imminent failure. The sensor signal noise component is determined 406 and compared 408 to a historical noise component retrieved from the historical database. The historical noise component is selected based on the current sensor range of span and the engine operating conditions such that comparison 408 is made between a current noise component and a historical noise signature that is representative of the current operating conditions. Engine operating conditions may be determined from inputs from other engine and airframe sensors. Comparing 408 the current noise component to historical noise components that share similar range and operating condition parameters ensures comparison 408 is valid in that similar potential noise generating conditions are common to both compared 408 signals. Historical noise components may be projected or extrapolated into the future to determine predicted noise components, which are then compared 408 to the historical noise components to facilitate predicting an estimated time to failure. The. current noise component is then added 410 to the historical database for future comparisons.

If comparison 408 yields a difference between the current noise component and the historical noise component that exceeds a predetermined and selectable limit, a possible failure mode or modes is determined 412. Failure modes with known noise component symptoms are selected from a database of archived failure mode data that is associated with each symptom. The determined failure modes may be output 414 to a display, a computer, a control device, and/or another module of ECU 200.

While the present invention is described with reference to an engine, numerous other applications are contemplated. It is contemplated that the present invention may be applied to any system, including a sensor testing facility that includes sensors that are subject to failure wherein sensor output signals are able to be collected and analyzed.

The above described sensor failure detection system is cost-effective and highly reliable for determining an impending failure of a sensor. More specifically, the methods and systems described herein facilitate determining a soft failure and symptoms that may indicate a future failure of a sensor. In addition, the above-described methods and systems facilitate providing an early warning of impending sensor failure before traditional maintenance and testing means are able to provide a warning. As a result, the methods and systems described herein facilitate reducing maintenance costs in a cost-effective and reliable manner.

Exemplary embodiments of sensor failure detection systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for detecting an impending failure of a process sensor used to sense process parameters within a process system, said method comprising:
   determining a sensor output noise component; and
   comparing the output noise component to a historical sensor output noise signature based on at least one of a range of span of the sensor and the process operating conditions.

2. A method in accordance with claim 1 further comprising determining a current sensor output signal.

3. A method in accordance with claim 2 wherein determining a current sensor output signal comprises sampling the sensor output for a predetermined time period to obtain a representative sample of the output signal.

4. A method in accordance with claim 2 wherein determining a current sensor output signal comprises determining a range of span of the sensor.

5. A method in accordance with claim 1 further comprising adding the determined sensor noise component to a historical sensor noise signature database wherein each signature is associated with at least one of the range of span of the sensor at the time of sampling of the signature and system operating conditions at the time of sampling of the signature.

6. A method in accordance with claim 1 further comprising determining if the sensor output noise component exceeds a predetermined limit relative to a historical output noise signature of the sensor.

7. A method in accordance with claim 6 wherein determining if the current sensor output noise component exceeds a predetermined limit comprises using a statistical algorithm to determine if the sensor output noise component exceeds the predetermined limit.

8. A method in accordance with claim 6 further comprising determining at least one associated sensor failure mode type for each noise component that exceeds the predetermined limit.

9. A method in accordance with claim 8 further comprising transmitting the determined at least one failure mode type to an output for incorporation into a maintenance schedule.

10. A method in accordance with claim 8 wherein determining at least one associated sensor failure mode type comprises determining at least one associated sensor failure mode type based on at least one of a sensor element failure, a sensor transmitter failure, a transducer failure, a process connection failure, an induced noise failure, and a sensor environmental failure.

11. A method in accordance with claim 1 further comprising:
   extrapolating a historical noise component into future time;
   determining predicted noise components based on the historical noise component;
   comparing the predicted noise component to a historical sensor output noise signature to facilitate predicting an estimated time to failure.

12. A method for detecting an impending failure of a gas turbine engine sensor wherein the sensor senses operating parameters of the gas turbine engine, said method comprising:
   sampling the sensor output for a predetermined time period to obtain a representative sample of the output signal;
   determining a current sensor output signal;
   determining a range of span of the signal;
   determining a sensor output signal noise component; and
   comparing the output signal noise component to a historical sensor output noise signature based on at least one of the range of span of the sensor, and the engine operating conditions.

13. A method in accordance with claim 12 further comprising adding the determined sensor noise component to a historical sensor noise signature database wherein each signature is associated with at least one of a range of span of the sensor at the time of sampling of the signature and the engine operating conditions at the time of sampling of the signature.

14. A method in accordance with claim 12 further comprising determining if the current sensor output noise component exceeds a predetermined limit relative to a historical sensor output noise signature.

15. A method in accordance with claim 12 further comprising transmitting at least one determined failure mode type to an output for incorporation into a maintenance schedule.

16. Apparatus for a gas turbine engine, said apparatus comprising a computing device comprising a processor and a memory communicatively coupled to said processor, said processor programmed to execute a software product code segment comprising a comparator, a data historian, an isolator module, and a limit module, said computing device programmed to detect impending failure of a sensor using an output signal noise component of said sensor, said sensor senses a parameter of a process associated with said computing device.

17. Apparatus in accordance with claim 16 wherein said computing device comprises an engine control unit (ECU), and is further configured to:
   sample the sensor output for a predetermined time period for obtaining a representative sample of the output signal;
   determine a current sensor output signal;
   determine a range of span of the sensor output signal;
   determine an output noise component of the sensor output signal; and
   compare the output noise component to a historical sensor output noise signature based on at least one of a range of span of the sensor output signal, and the process operating conditions.

18. Apparatus in accordance with claim 17 wherein said ECU is configured to predict a future sensor output noise component based on at least one of the current output signal noise component, the historical sensor output noise signature, and at least one operating condition of said process.

19. An apparatus in accordance with claim 18 configured to compare the predicted sensor output noise component to the historical sensor output noise signature based on at least one of a range of span of the sensor output signal, and the process operating conditions.

20. An apparatus in accordance with claim 19 configured to estimate a time to failure of said sensor.

* * * * *